United States Patent [19]

Nakashima et al.

[11] Patent Number: 4,732,526

[45] Date of Patent: Mar. 22, 1988

[54] EXPLOSION-PROOF INDUSTRIAL ROBOT

[75] Inventors: Seiichiro Nakashima; Kenichi Toyoda; Akihiro Terada; Hitoshi Mizuno, all of Hino, Japan

[73] Assignee: Fanuc Ltd., Yamanashi, Japan

[21] Appl. No.: 848,378

[22] PCT Filed: Jun. 28, 1985

[86] PCT No.: PCT/JP85/00365

§ 371 Date: Apr. 29, 1986

§ 102(e) Date: Apr. 29, 1986

[87] PCT Pub. No.: WO86/00256

PCT Pub. Date: Jan. 16, 1986

[30] Foreign Application Priority Data

Jun. 29, 1884 [JP] Japan ................. 59-133002

[51] Int. Cl.$^4$ .............................................. B25J 3/00
[52] U.S. Cl. ..................... 414/730; 310/88; 414/8; 901/15; 901/21; 901/23; 901/49
[58] Field of Search ................ 414/8, 3, 680, 744 R, 414/730; 901/18, 21, 23, 24, 49, 50, 14, 15; 310/88; 339/198 R

[56] References Cited

U.S. PATENT DOCUMENTS

| | | | |
|---|---|---|---|
| 2,976,945 | 3/1961 | Schreck | 310/88 X |
| 3,016,813 | 1/1962 | Frasier et al. | 310/88 X |
| 3,447,000 | 5/1969 | Dugan et al. | 310/88 X |
| 4,343,529 | 8/1982 | Reavis, Jr. et al. | 339/198 R |
| 4,507,046 | 3/1985 | Sugimoto et al. | 901/49 X |
| 4,555,216 | 11/1985 | Buschor | 414/8 X |
| 4,557,662 | 12/1985 | Terauchi et al. | 901/21 X |
| 4,568,238 | 2/1986 | Hirano et al. | 901/23 X |
| 4,601,635 | 7/1986 | Ito et al. | 901/15 X |
| 4,668,146 | 5/1987 | Ageta | 901/49 X |

FOREIGN PATENT DOCUMENTS

| | | |
|---|---|---|
| 47-31147 | 11/1972 | Japan . |
| 48-79281 | 9/1973 | Japan . |
| 51-6951 | 3/1976 | Japan . |
| 51-87743 | 7/1976 | Japan . |
| 57-9237 | 1/1982 | Japan .................. 310/88 |

OTHER PUBLICATIONS

"Report from Robots"—Mechanical Engineering Magazine—Jul. 1986—pp. 65-68.

Primary Examiner—Robert J. Spar
Assistant Examiner—P. McCoy Smith
Attorney, Agent, or Firm—Armstrong, Nikaido, Marmelstein & Kubovcik

[57] ABSTRACT

An electric industrial robot comprises a movable robot assembly (10) forming therein an airtight chamber, and an electric drive unit for driving the robot assembly. The electric drive unit comprises a plurality of motors (36-41). The respective casings (36a-41a) of the motors are disposed within the airtight chamber (30) of the robot assembly. Electric cables (57-62) connected to the motors, respectively, are led through the airtight chamber into a fixed pipe (67) connected to the robot assembly. The interior of the motors and the interior of the airtight chamber are kept at a pressure higher than an atmospheric pressure outside the robot assembly.

8 Claims, 6 Drawing Figures

Fig. 2
Fig. 3
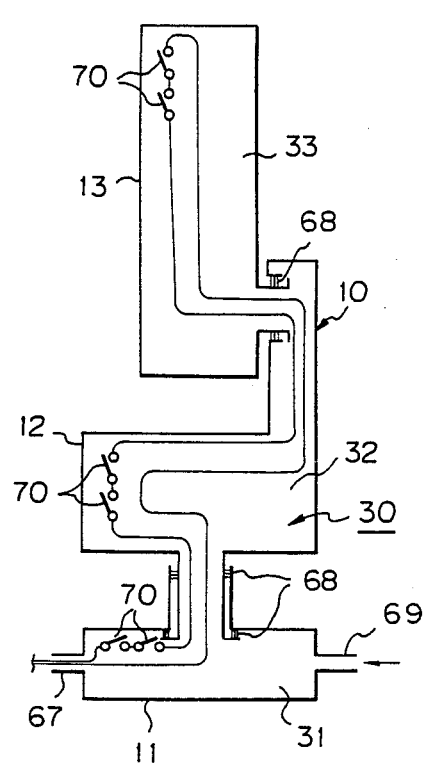
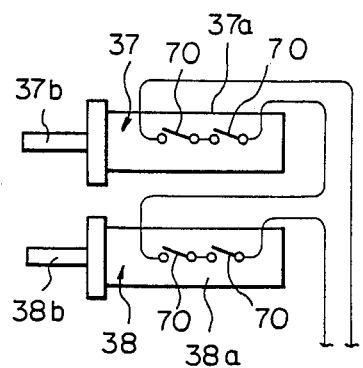

EXPLOSION-PROOF INDUSTRIAL ROBOT

DESCRIPTION

1. TECHNICAL FIELD

The present invention relates to an industrial robot and more particularly to an internally pressurized explosion-proof industrial robot.

2. BACKGROUND ART

Generally, an electric industrial robot comprises a robot assembly and a plurality of electric servomotors for driving the robot assembly. In the conventional electric industrial robot, the casing of the electric servomotors and the electric cables connected to the casing of the motors are exposed outside the robot assembly. Accordingly, it has been dangerous to operate a conventional industrial robot in an inflammable or explosive environment.

DISCLOSURE OF THE INVENTION

According to the present invention, there is provided an industrial robot comprising a robot assembly defining therein an airtight chamber, electric drive motors adapted to drive the robot assembly, electric cables connected to the electric drive units, and a fixed pipe fixture attached to the robot assembly, wherein the electric drive motors have casings, respectively, arranged in the airtight chamber of the robot assembly, the electric cables extending into the pipe fixture through the airtight chamber, and wherein the interior of the electric drive motors and the interior of the airtight chamber are kept at a pressure higher than an atmospheric pressure outside the robot assembly.

In the above-mentioned robot, the casings of the electric drive motors and the electric cables are arranged in the airtight chamber, and the interior of the electric drive motors and the interior of the airtight chamber are kept at a pressure higher than the atmospheric pressure outside the robot assembly. Therefore, it is possible to provide an electric industrial robot having a reliable internally pressurized explosion-proof structure.

Preferably, the robot assembly includes a stationary base unit to which an air supply pipe is connected, and an air having a pressure higher than the atmospheric pressure outside the robot assembly is fed into the airtight chamber of the robot assembly through the air supply pipe. Consequently, it is possible to prevent the leakage of an inflammable or explosive gas from the exterior of the robot assembly into the airtight chamber even if a leak gap occurs between the airtight chamber of the robot assembly and the exterior thereof.

Preferably, pressure switches are provided within the airtight chamber of the robot assembly and the electric drive motors. The pressure detectors act to stop the operation of the robot before an inflammable or explosive gas in the exterior of the robot assembly enters into the airtight chamber when the pressure in the airtight chamber of the robot assembly is decreased. Consequently, security against fire or the exploding of a robot can further improved.

The above-mentioned or other features or advantages of the present invention will be made more apparent by the following detailed description with reference to the attached drawings.

BRIEF EXPLANATION OF THE DRAWINGS

FIG. 2 is a schematic view illustrating the disposition and connection of the pressure switches in the robot shown in FIG. 1;

FIG. 3 is a schematic view illustrating the disposition and connection of other pressure switches in association with the corresponding servomotors in the robot shown in FIG. 1;

BEST MODE FOR CARRYING OUT THE INVENTION

Figure 1:
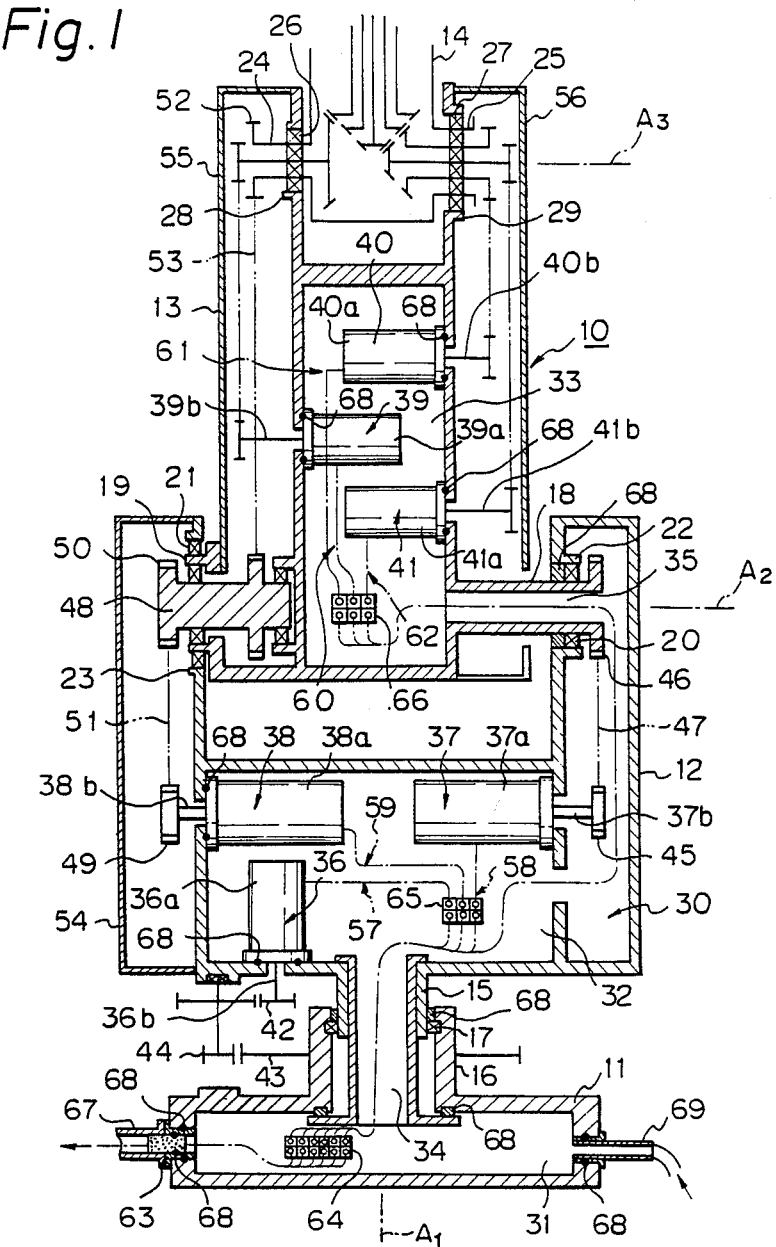
FIG. 1 is a cross-section view of the principal portion of a six-axis articulated industrial robot showing a first embodiment of the present invention.

FIG. 1 shows a first embodiment of the present invention as applied to a six-axis articulated industrial robot. In FIG. 1, a robot assembly of the industrial robot is denoted generally by reference numeral 10. The robot assembly 10 comprises a stationary base unit 11 fixedly installed on a bed, a swiveling body unit 12 joined to the stationary base unit 11 so as to be turnable relative to the stationary base unit 11 about a first axis A1 perpendicular to the surface of the bed, an upper arm 13 joined to the swiveling body unit 12 so as to be turnable relative to the swiveling body unit 12 about a second axis A2 perpendicular to the first axis A1, and a forearm 14 joined to the upper arm 13 so as to be turnable relative to the upper arm 13 about a third axis A3 parallel to the second axis A2. A known wrist assembly, not shown, capable of three-axis motion relative to the forearm 14 is attached to the tip end portion of the forearm 14.

The swiveling body unit 12 has a shaft 15 extending coaxially with the first axis A1. The shaft 15 is a supported rotatably in a bearing 17 on a bearing unit 16 formed on the stationary base unit 11. The upper arm 13 has a first shaft 18 and a second shaft 19 each extending coaxially with the second axis A2. The shafts 18 and 19 are supported rotatably in bearings 20 and 21 on the bearing units 22 and 23 of the swiveling body unit 12, respectively. The forearm 14 has a first shaft 24 and a second shaft 25 each extending coaxially with the second axis A3. The shafts 24 and 25 are supported rotatably in bearings 26 and 27 on the bearing units 28 and 29 of the forearm, respectively.

An airtight chamber denoted generally by reference numeral 30 is formed within the robot assembly 10. In this embodiment, the airtight chamber 30 comprises a first airtight chamber 31 formed within the stationary base unit 11, a second airtight chamber 32 formed within the swiveling body unit 12, and a third airtight chamber 33 formed within the upper arm 13. The shaft 15 of the swiveling body unit 12 is formed in a tubular shape. The second airtight chamber 32 formed in the swiveling body unit 12 communicates with the first airtight chamber 31 in the stationary base unit 11 by means of a passage 34 formed through the shaft 15.

The first shaft 18 of the upper arm 13 is formed in a tubular shape. The third airtight chamber 33 formed in the upper arm 13 communicates with the second airtight chamber 32 in the swiveling body unit 12 by a passage 35 formed through the shaft 18.

The robot is provided with six electric servomotors 36 to 41 for driving the components of the robot assembly 10. Although the electric servomotrs may be DC servomotors, the electric servomotors 36 to 41 employed in this embodiment are AC servomotors which, in the normal state, do not contain an ignition source therein. The AC servomotor 36 to 41 comprise casings 36a to 41a and output shafts 36b to 41b projecting outside from the casings 36a to 41a respectively.

The casing 36a of the servomotor 36 for rotationally driving the swiveling body unit 12 is disposed within the second airtight chamber 32 of the swiveling body unit 12 and the output shaft 36b of the same projects outside through the external wall of the swiveling body unit 12. A gear 42 is fixed to the output shaft 36b of the servomotor 36 and interlocked with a gear 43 fixed to the stationary base unit 11 through an intermediate double gear 44.

The casing 37a of the servomotor 37 for rotational driving the upper arm 13 is disposed within the second airtight chamber 32 of the swiveling body unit 12. A sprocket 45 fixed to the output shaft 37b of the servomotor 37 is interlocked with a sprocket 46 fixed to the first shaft 18 of the upper arm 13 by means of a chain 47.

The casing 38a of the servomotor 38 for rotationally driving the forearm 14 is disposed within the second airtight chamber 32 of the swiveling body unit 12. The output shaft 38b of the servomotor 38 projects outside through the external wall of the swiveling body unit 12. An intermediate shaft 48 is supported rotatably on and coaxially with the second shaft 19 or the upper arm 14. A sprocket 49 fixed to the output shaft 38b of the servomotor 38 is interlocked with an intermediate double sprocket 50 fixed to the intermediate shaft 48 by means of a chain 51. The intermediate double sprocket 50 is interlocked with a sprocket 52 fixed to the first shaft 28 of the forearm 14 by means of a chain 53.

The casings 39a, 40a, and 41a, and of the servomotors 39 to 41 for driving the wrist assembly are disposed within the third airtight chamber 33 of the upper arm 13. The output shafts 39b to 41b of the servomotors 39 to 41 project outside through the external wall of the upper arm 14. The respective spaces covered with a cover attached to the swiveling body unit 12 and the covers 55 and 56 attached to the upper arm 14 need not be kept airtight.

Electric cables 57 to 62 connected at inner ends thereof to the servomotors 36 to 41, respectively, are arranged within the airtight chamber 30, and the outer ends thereof are connected to a fixed pipe fixture 63 fixed to the external wall of the stationary base unit 11. More specifically, in this embodiment, a first terminal block 64, a second terminal block 65, and a third terminal block 66 are provided within the first airtight chamber 31 of the stationary base unit 11, the second airtight chamber 32 of the swiveling body unit 12, and the third airtight chamber 33 of the upper arm 13, respectively. The electric cables 57 to 59 connected to the three servomotors 36 to 38 disposed within the second airtight chamber 32 of the swiveling body unit 12, respectively, have first sections extending between the casings 36a to 38a of the servomotors 36 to 38 and the second terminal block 65 provided within the second airtight chamber 32, second sections extending between the second terminal block 65 and the first terminal block 64 provided within the first airtight chamber 31, and third sections extending between the first terminal block 64 and the fixed pipe fixture 63, respectively. On the other hand, the electric cables 60 to 62 connected to the three servomotors 39 to 41 disposed within the third airtight chamber 33 of the upper arm 13, respectively, have first sections extending between the casings 39a to 41a of the servomotors 39 to 41 and the third terminal block 66 provided within the third airtight chamber 33, second sections extending between the third terminal block 66 and the first terminal block 64 provided within the first airtight chamber 31, and third sections extending between the first terminal block 64 and the fixed pipe fixture 63, respectively. All of the second sections of the electric cables 57 to 62 are tied in a bundle. Similarly, the third sections of the electric cables 57 to 62 are tied in a bundle and the bundle of third sections is led through the fixed pipe fixture 63 and a fixed pipe 67 to a control unit, not shown. Since the second sections extend through the rotary joints of the robot assembly 10, the second sections are apt to deteriorate more quickly than the first and third sections. Accordingly, in this embodiment, the second sections of the electric cables 57 to 62 are separated from the first and third sections by means of the terminal blocks 64 to 66, respectively, so that the second sections of the electric cables 57 to 62 can be easily replaced with new ones.

The casings 36a to 41a of the servomotors 36 to 41 are provided with sealing means, not shown, to keep the respective interiors of the servomotors airtight. The sealing means includes sealing rings, not shown, arranged between the casings 36a to 41a and the corresponding output shafts 36a to 41b respectively. The robot assembly 10 is provided with sealing means, denoted by reference numeral 68, to keep the airtight chamber 30 airtight against the atmosphere outside the robot assembly 10.

The airtight chamber 30 is kept at a pressure higher than the atmospheric pressure outside the robot assembly 10. In order to keep the airtight chamber 30 airtight, the chamber may be sealed perfectly, however, in this embodiment, an air supply pipe 69 for supplying a pressurized air having a pressure higher than the atmospheric pressure outside the robot assembly 10 into the airtight chamber 30 is connected to the stationary base unit 11. The pressurized air is continuously supplied through the air supply pipe 69 into the chamber 30 during the operation of the robot.

As schematically shown in FIG. 2 but not shown in FIG. 1, pressure switches 70 for detecting pressure drop in the airtight chamber 30 are provided within the airtight chamber 30. The servomotors 36 to 41 are stopped instantly upon the detection of a pressure drop in the airtight chamber 30 by some pressure switch or an other. One pressure switch may be sufficient, however, in this embodiment, two switches are provided within each of the first, second, and third airtight chambers 31, 32 and 33. These six pressure switches 70 are connected in series. Accordingly, the pressure drop in the first, second, and third airtight chambers 31, 32 and 33 can be detected without delay. Furthermore, since a pair of the pressure switches 70 are provided in each airtight chamber, the pressure drop detecting function is effectively maintained even if either one of the pressure switches 70 fails to function, and thereby the safety of the robot assembly is enhanced.

As schematically illustrated in FIG. 3, the pressure switches 70 may be provided within each servomotor (only two servomotors 37 and 38 are illustrated in FIG. 3). When the pressure switches 70 are provided within the servomotor, the pressure switches may be connected in series as illustrated in FIG. 3. Furthermore, the pressure switches provided within the servomotors may be connected in series to the pressure switches provided within the airtight chamber.

Figure 4:
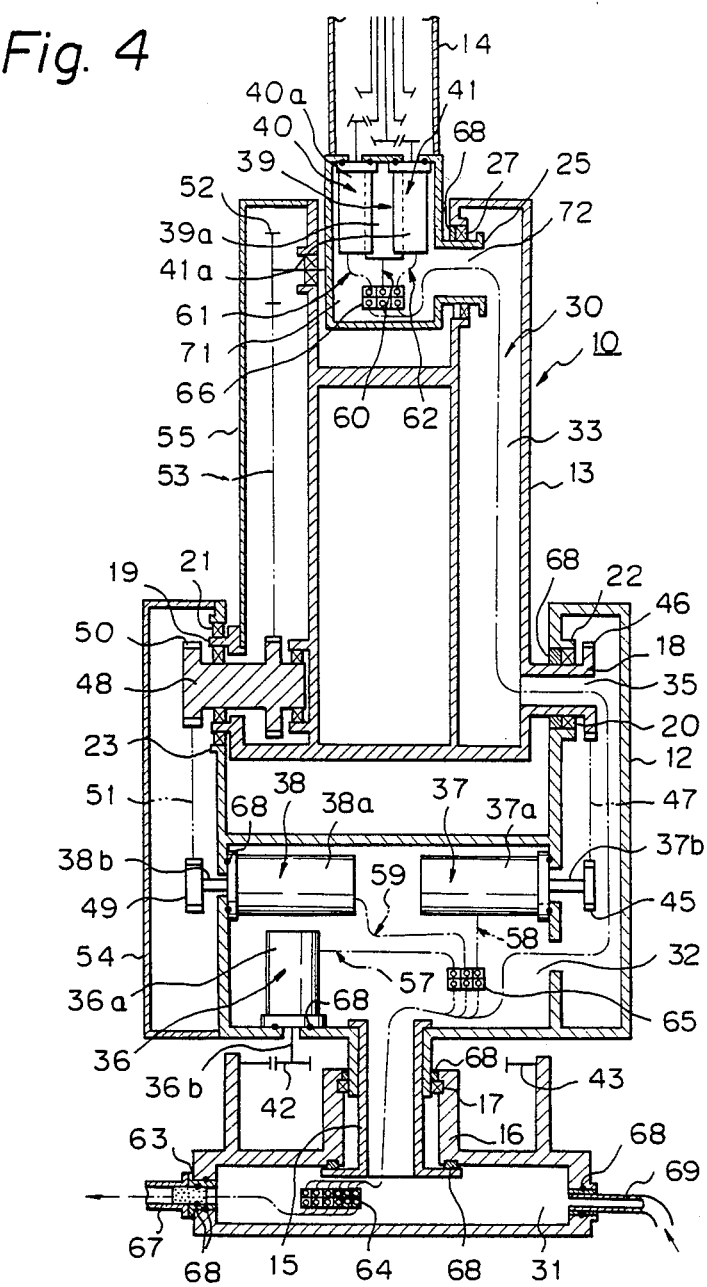
FIG. 4 is a cross-section view of the principal portion of a six-axis articulated industrial robot showing a second embodiment of the present invention.

FIG. 4 illustrates a second embodiment of the present invention. In FIGS. 1 to 4, the same reference characters designate like or corresponding components.

In the second embodiment, the airtight chamber 30 has a first airtight chamber 31 formed within a stationary base unit 11, a second airtight chamber 32 formed within a swiveling body unit 12, a third airtight chamber 33 formed within an upper arm 13, and a fourth airtight chamber 71 formed within a forearm 14. The casings 39a to 41a of the AC servomotors 39 to 41 for driving a three-axis wrist unit are disposed within the fourth airtight chamber 71. The fourth airtight chamber 71 communicates with the third airtight chamber 33 of the upper arm 13 by means of a passage 72 formed through the tubular second shaft 25 of the forearm 14.

Similar to those of the first embodiment, a first terminal block 64 and a second terminal block 65 are provided within the first airtight chamber 31 and the second airtight chamber 32, respectively. In this embodiment, a third terminal block 66 is provided within the fourth airtight chamber 71. Electric cables 60 to 62 are connected at the respective inner ends thereof to the servomotors 39 to 41, respectively, and have first sections extending between the casings 39a to 41a of the servomotors 39 to 41 and the third terminal block 66 provided within the fourth airtight chamber 71, second sections extending between the third terminal block 66 and the first terminal block 64 provided within the first airtight chamber 31, and third sections extending between the first terminal block 64 and a fixed pipe fixture 63, respectively. The other construction of the second embodiment is the same as that of the first embodiment. Thus the second embodiment also provides a reliable internally pressurized explosion-proof structure.

Figure 5:
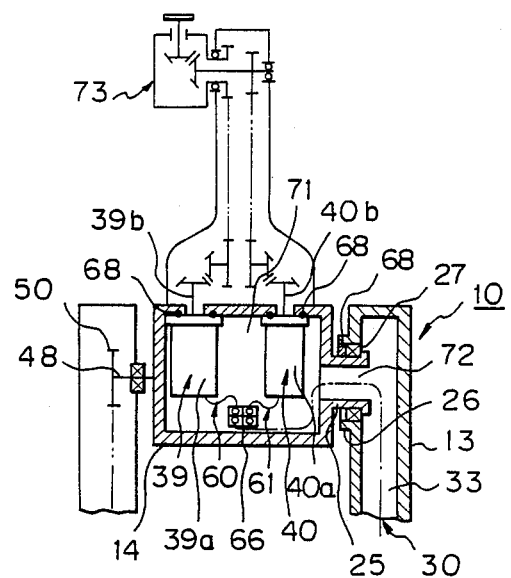
FIG. 5 is a cross-section view of the principal portion of a five-axis articulated industrial robot showing a third embodiment of the present invention, this robot being similar to the robot shown in FIG. 4.

FIG. 5 illustrates a third embodiment of the present invention as applied to a five-axis articulated industrial robot. Similar to the second embodiment shown in FIG. 4, the third embodiment has a fourth airtight chamber 71 provided within the forearm 14, and a third terminal block 66 provided within the fourth airtight chamber 71.

A wrist unit 73 shown in FIG. 5 is a two-axis wrist unit, and hence two AC servomotors 39 and 40 having casings 39a and 40a, respectively, are provided for driving the wrist unit 73. Thus, the third embodiment comprises five servomotors in total. The construction of portions of the third embodiment not shown in FIG. 5 is the same as that of the corresponding portions of the second embodiment shown in FIG. 4. Accordingly, the third embodiment also provides a reliable internally pressurized explosion-proof structure.

Figure 6:
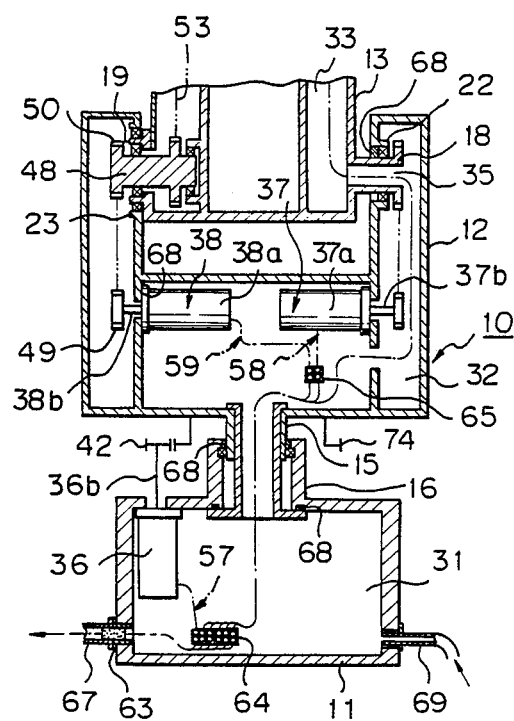
FIG. 6 is a cross-section view of the principal portion of an industrial robot showing a fourth embodiment of the present invention, this robot being similar to the robot shown in FIG. 4.

FIG. 6 illustrates a fourth embodiment of the present invention. The fourth embodiment is similar to the second embodiment shown in FIG. 4, except that the casing 36a of the AC servomotor 36 for rotationally driving a swiveling body unit 12 is disposed within a first airtight chamber 31. A gear 42 fixed to the output shaft 36b of the servomotor 36 is in mesh with a gear 74 fixed to the swiveling body unit 12. An electric cable 57 connected to the servomotor 36 has a first section extending between the casing 36a of the servomotor 36 and a first terminal block 64 provided within the first airtight chamber 31, and a second section extending between the first terminal block and a fixed pipe fixture 63. The construction of other portions of the fourth embodiment is the same as that of the second embodiment shown in FIG. 4. Accordingly, the fourth embodiment also provides a reliable internally pressurized explosion-proof structure.

Although the present invention has been described with reference to preferred embodiments shown in the accompanying drawings, the present invention is not limited thereto, but various changes and modifications are possible in the invention. For example, in a modification of the first embodiment shown in FIG. 1, the servomotor for driving the swiveling body unit may be disposed within the first airtight chamber of the stationary base unit as shown in FIG. 6. Furthermore, the present invention is applicable to robot assemblies having any other type of motion.

CAPABILITY OF EXPLOITATION IN INDUSTRY

The present invention can provide an electric industrial robot having a reliable internally pressurized explosion-proof structure. Therefore, the safety of the robot operated in an inflammable or explosive environment can be improved.

We claim:

1. An industrial robot for use in an atmosphere containing an inflammable or explosive gas, comprising:
    a stationary base unit having therein a first airtight chamber;
    a swiveling body unit rotatably connected to said stationary base unit through a first hollow shaft for rotation about a first axis and having therein a second airtight chamber which is communicated with said first airtight chamber through the interior of said first hollow shaft;
    an upper arm rotatably connected to said swiveling body unit through a second hollow shaft fixed to said upper arm for rotation about a second axis perpendicular to said first axis and having therein a third airtight chamber which is communicated with said second airtight chamber through the interior of said second hollow shaft;
    a forearm rotatably connected to said upper arm for rotation about a third axis parallel to said second axis and for supporting thereon a three-axis wrist assembly having three degrees of motion;
    a first group of three electric drive motors, for driving said swiveling robot body unit, said upper arm and said forearm, respectively, said electric drive motors being located in said second airtight chamber;
    a second group of three electric drive motors, for driving said wrist assembly, said second group of electric drive motors being located in said third airtight chamber;
    a first group of electric cables connected to said first group of three electric motors in said second airtight chamber and extending from the interior of said second airtight chamber into a fixed pipe fixedly connected to said stationary base unit through said first hollow shaft and further into said first airtight chamber;

a second group of electric cables connected to said second group of three electric motors in said third airtight chambers and extending from the interior of said third airtight chambers into said fixed pipe through said second hollow shaft, said second airtight chamber, said first hollow shaft and into said first airtight chamber; and, an air supply pipe connected to said stationary base unit for supplying pressurized air to said first, second and third airtight chambers to maintain the interior of said airtight chambers at a predetermined pressure higher than atmospheric pressure outside said airtight chambers and thus prevent seepage of said inflammable or explosive gas into said airtight chamber.

2. A robot according to claim 1, wherein pressure switches for detecting pressure drop in said first, second and third airtight chambers are disposed in at least one of said airtight chambers.

3. A robot according to claim 2, wherein additional pressure switches for detecting pressure drop in said drive motors are disposed in said drive motors.

4. A robot according to claim 1, wherein first, second and third terminal blocks are disposed in said first, second and third airtight chambers, respectively, and wherein each of said electric cables in said first group includes at least three cable sections which are interconnected through said first and second terminal blocks, and each of said electric cables in said second group includes at least three cable sections which are interconnected through said first and third terminal blocks.

5. A robot according to claim 1, wherein said motor for driving said swiveling body unit has an input shaft extending outward from said second airtight chamber and connected to said stationary base unit through a first power transmitting means.

6. A robot according to claim 1, wherein said motor for driving said upper arm has an output shaft located within said second airtight chamber and connected to said second hollow shaft fixed to said upper arm through a second power transmitting means.

7. A robot according to claim 1, wherein said motor for driving said forearm has an output shaft extending outward from said second airtight chamber and connected to said forearm through a third power transmitting means.

8. A robot according to claim 1, wherein said motors for driving said wrist assembly have output shafts, respectively, extending outward from said third airtight chamber and connected to said wrist assembly through a fourth power transmitting means.

* * * * *